Nov. 6, 1934. F. H. MUELLER 1,979,760
PIPE OR ROD COUPLING AND JOINT
Filed June 2, 1933
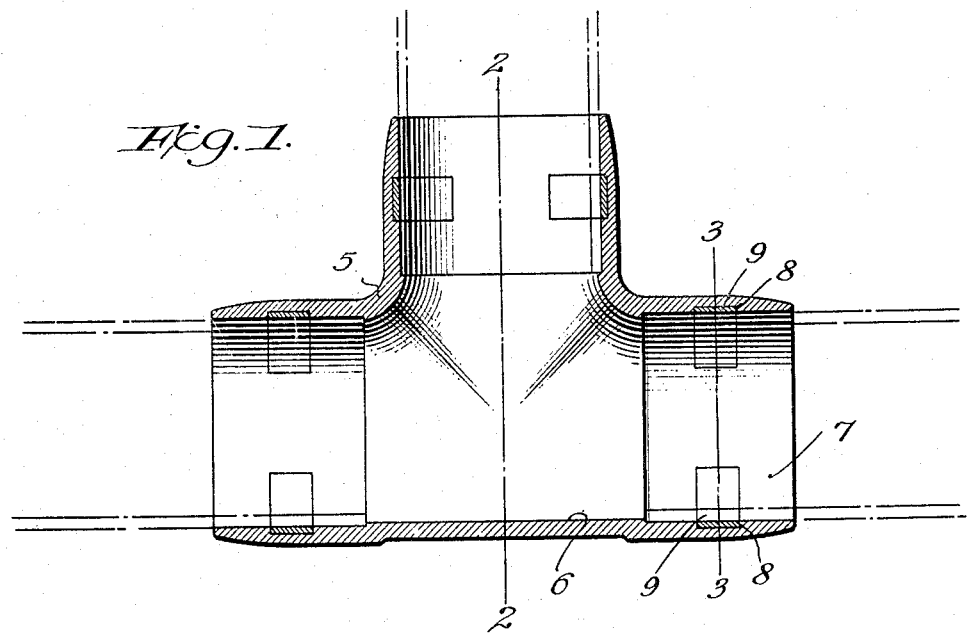
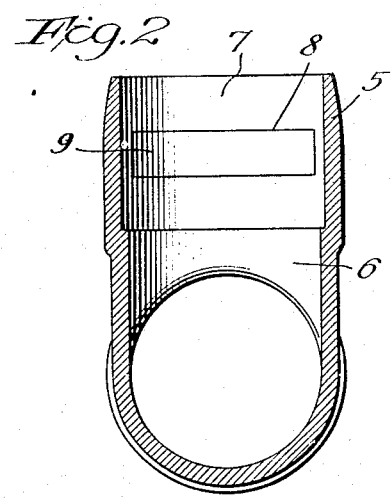
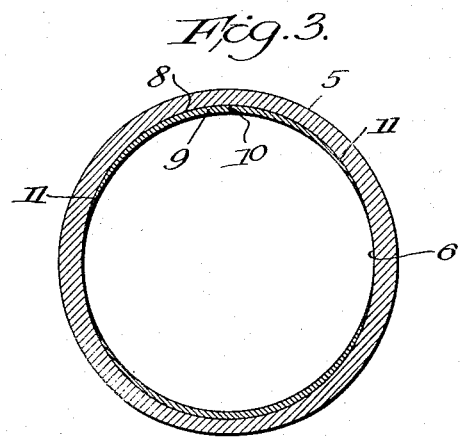
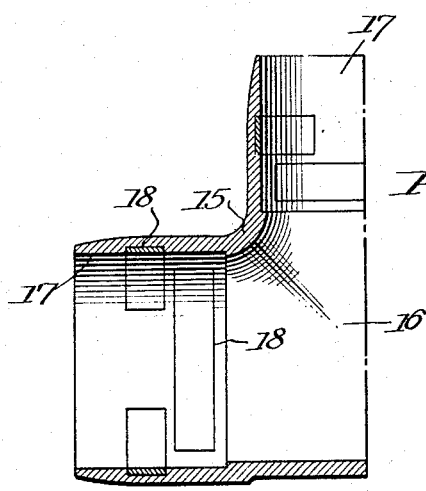
Inventor
Frank H. Mueller
By Cushman, Darby & Cushman
Attorneys Patented Nov. 6, 1934

1,979,760

UNITED STATES PATENT OFFICE 1,979,760

PIPE OR ROD COUPLING AND JOINT

Frank H. Mueller, Decatur, Ill., assignor to Mueller Co., Decatur, Ill., a corporation of Illinois Application June 2, 1933, Serial No. 674,090

4 Claims. (Cl. 285—115)

The present invention relates to a pipe or rod coupling and the joint formed thereby. More particularly, the invention relates to a pipe or rod coupling or fitting which is adapted to be sealed to a length of pipe or rod to form a joint by means of solder or a similar fusible bonding material which is incorporated in the fitting during its manufacture. In another aspect, the invention comprises a joint including a coupling or fitting of the type described.

In the manufacture of fittings provided with recesses containing a fusible bonding material, ordinarily solder, the bonding material is usually placed in an annular groove extending circumferentially about the bore of the fitting. When a length of pipe is inserted in the bore of the fitting, heat is applied to the fitting, for example, by means of a blowtorch or the like, to heat the fitting sufficiently to cause the solder in the annular recess to be melted and flow into the very small space between the exterior of the pipe and the wall of the bore of the fitting. The solder, when it again becomes hard, seals the pipe to the fitting. It is customary to have the diameter of the bore of the fitting only very slightly over-sized with respect to the external diameter of the pipe so that the movement of the solder from the annular recess will be aided by capillary action.

In fittings provided with a continuous annular groove containing solder, the groove must be of minimum width and of substantial depth in order to contain sufficient solder to permit the solder, flowing in two axial directions, to form a proper seal. The depth of the groove naturally weakens the fitting to some extent and the sealing area provided by the solder comprises two circumferential bands about the pipe, one on each side of the groove in the pipe fitting, the groove then being left empty.

The principal object of the present invention is to provide a pipe or rod coupling or fitting which may be readily and efficiently sealed to a length of pipe or rod. This object also encompasses a joint formed in a new and improved manner.

Another object of the invention is to provide a pipe or rod coupling or fitting and a joint formed thereby, the coupling or fitting being provided with a plurality of circumferentially spaced recesses.

A pipe coupling or fitting provided with circumferentially spaced recesses instead of a continuous annular recess is of greater strength than a fitting formed with a continuous groove, for the reason that the fitting is not weakened about its entire circumference by a recess. The joint formed by the use of such a fitting will be correspondingly increased in strength.

Still another object of the invention is to provide a fitting provided with circumferentially spaced recesses wherein the recesses are of less depth at their circumferential edges than at a point intermediate such edges. In other words, the recesses have feathered circumferential edges.

By this arrangement, the recesses only have a substantial depth over a relatively narrow area of the circumference of the fitting. If, as is preferred, the recesses have a substantial width axially of the bore of the fitting, the solder or other fusible bonding material in the recess will lie in the recess in a comparatively thin sheet, with the result that the solder will be caused to flow from the recess by a degree of heat substantially less than that required to heat the solder in a deeper recess.

In one embodiment of the invention, the fitting is provided with two or more series of circumferentially spaced recesses, the recesses of one series being staggered or circumferentially offset with respect to the recesses of the other series. The provision of a plurality of series of staggered recesses insures that the solder will form a seal over a larger area. Nevertheless, since the recesses are staggered, the fitting will be of greater strength than is the case in a fitting provided with a continuous annular recess.

Other objects and advantages of the invention will be apparent from the following specification and drawing, wherein:

Figure 1 is a longitudinal sectional view through a fitting of my invention.

Figure 2 is a transverse sectional view on the line 2—2 of Figure 1.

Figure 3 is a transverse sectional view on the line 3—3 of Figure 1, and

Figure 4 is a longitudinal sectional view through one end of a modified form of the fitting of my invention.

In the drawing, a T-fitting is illustrated, but it will be understood that the invention may be applied to any type of coupling adapted for use in joining pipes or rods.

Referring to Figures 1 to 3, the numeral 5 designates the fitting which is provided with a bore 6. The bore 6 is preferably countersunk as at 7 at each terminal or end thereof and circumferentially extending recesses 8, filled with solder or other fusible bonding material 9, are circumferentially spaced about the counterbored portions 7 of the bore 6. The solder or other fusible material may be applied to the recesses in any desired manner, preferably during manufacture of the coupling, either by being flowed into the recesses or by a machining operation.

As is best shown in Figure 3, the recesses 8 are preferably of greater depth at a point 10 intermediate their length than at their circumferential edges 11. The recesses are preferably substantially crescent-shaped, as shown in Figure 3, and the surface of the solder 9 facing into the bore 6 of the fitting substantially conforms to the diameter of the bore.

In connecting the fitting 5 to a length of pipe, the pipe is inserted in one terminal or end of the fitting as shown in dotted lines in Figure 1 and heat is then applied to the fitting to melt the solder 9 in the recesses 8. The melted solder will flow from each edge of the recesses 8 and into the space between the wall of the bore 6 of the fitting and the exterior of the pipe to completely seal the same.

Due to the fact that the recesses are not of a substantial depth, the solder may be readily heated.

Referring to Figure 4, the fitting 15 is provided with a bore 16 which preferably has its terminals or ends counterbored as at 17. Two series or rows of circumferentially spaced recesses 18 are provided in the counterbored portion 17, the recesses of each row being staggered or circumferentially offset with respect to each other. These recesses are substantially filled with solder or other fusible bonding material in the same manner as the recesses 8 of the form shown in Figures 1 to 3 and are preferably of the same shape as the latter recesses.

Since the recesses 18 are arranged in two staggered rows, a seal will be provided over a greater area than is the case in the form shown in Figures 1 to 3. However, in most installations, the provision of a single row or series of recesses will be entirely sufficient to provide a proper seal. The mode of connecting this form of my invention to a pipe or rod will be obvious from the explanation given in connection with the form shown in Figures 1 and 3.

It will be observed that a joint formed by use of the coupling or fitting of my invention will be stronger and more securely sealed than is the case with the use of other types of couplings.

It will be understood that the invention is not limited to the details of construction shown in the drawing and described in the specification and that the examples of the use of the device which have been given do not include all of the uses of which the device is capable; also, that the phraseology employed in the specification is for the purpose of description and not of limitation.

I claim:—

1. A coupling including a socket portion adapted to receive a member and provided with a plurality of recesses respectively circumferentially and axially offset, the recesses being substantially filled with fusible bonding material adapted to be fused to form a joint between the coupling and the inserted member.

2. A coupling including a socket portion adapted to receive a member and provided with a plurality of recesses deeper at their central portions than at two opposite edges thereof, the recesses being substantially filled with fusible bonding material adapted to be fused to form a joint between the coupling and the inserted member.

3. A coupling including a socket portion adapted to receive a member and provided with a plurality of circumferentially spaced recesses, the recesses having a greater depth at a point between their circumferential edges than at such edges, the recesses being substantially filled with fusible bonding material adapted to be fused to form a joint between the coupling and the inserted member.

4. A coupling having a socket portion adapted to receive a member and provided with a plurality of series of circumferentially spaced recesses of less depth at their circumferential edges than at a point between such edges, the recesses of different series being circumferentially offset with respect to each other and the recesses being substantially filled with fusible bonding material adapted to be fused to form a joint between the coupling and the inserted member.

FRANK H. MUELLER.